(12) United States Patent
Salter et al.

(10) Patent No.: US 11,661,493 B2
(45) Date of Patent: May 30, 2023

(54) ELECTRICALLY CONDUCTIVE, POLYMERIC VEHICLE COMPONENT

(71) Applicant: Ford Global Technologies, LLC, Dearborn, MI (US)

(72) Inventors: Stuart C. Salter, White Lake, MI (US); Paul Kenneth Dellock, Northville, MI (US); Richard Gall, Ann Arbor, MI (US); Dan Busuioc, Dearborn, MI (US); John Budaj, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 320 days.

(21) Appl. No.: 17/034,188

(22) Filed: Sep. 28, 2020

(65) Prior Publication Data

US 2022/0098385 A1 Mar. 31, 2022
US 2023/0132402 A9 Apr. 27, 2023

(51) Int. Cl.
| | | |
|---|---|---|
| *C08K 3/04* | (2006.01) | |
| *C08K 3/36* | (2006.01) | |
| *C08L 77/00* | (2006.01) | |
| *B60R 16/02* | (2006.01) | |
| *B62D 25/14* | (2006.01) | |
| *B82Y 30/00* | (2011.01) | |
| *B82Y 40/00* | (2011.01) | |

(52) U.S. Cl.
CPC .............. *C08K 3/041* (2017.05); *B60R 16/02* (2013.01); *B60R 16/0207* (2013.01); *B62D 25/145* (2013.01); *C08K 3/04* (2013.01); *C08K 3/042* (2017.05); *C08K 3/046* (2017.05); *C08K 3/36* (2013.01); *C08L 77/00* (2013.01); *B82Y 30/00* (2013.01); *B82Y 40/00* (2013.01); *C08K 2201/001* (2013.01); *C08K 2201/014* (2013.01)

(58) Field of Classification Search
None
See application file for complete search history.

(56) References Cited

U.S. PATENT DOCUMENTS

| | | | |
|---|---|---|---|
| 6,644,722 B2 | 11/2003 | Cooper | |
| 8,003,202 B2 | 8/2011 | Elia et al. | |
| 8,278,553 B2 | 10/2012 | Suzuki et al. | |
| 2007/0216067 A1* | 9/2007 | Bahr | C08K 7/24 977/735 |

(Continued)

OTHER PUBLICATIONS

Mortensen (2007). Concise Encyclopedia of Composite Materials (2nd Edition)—Glass Fibers, (pp. 415-419). Elsevier. Retrieved online from https://app.knovel.com/hotlink/pdf/id:kt00U06CS1/concise-encyclopedia/glass-fibers. A PDF copy that includes the book title pages is attached. (Year: 2007).*

*Primary Examiner* — Katie L. Hammer
(74) *Attorney, Agent, or Firm* — Vichit Chea; Price Heneveld LLP

(57) ABSTRACT

A vehicle component includes a polymeric material, a first filler, and a second filler. The polymeric material can be present at a concentration of at least about 35% by weight of the vehicle component. The first filler can be a carbon-containing filler dispersed within the polymeric material. The carbon-containing filler can be present at a concentration of at least about 20% by weight of the vehicle component. The second filler includes a substrate and carbon nanotubes. The carbon nanotubes extend from a surface of the substrate.

18 Claims, 9 Drawing Sheets

(56) References Cited

U.S. PATENT DOCUMENTS

| | | | | |
|---|---|---|---|---|
| 2008/0006796 A1* | 1/2008 | Khatua | ............... | C09C 1/36 |
| | | | | 252/500 |
| 2016/0276055 A1* | 9/2016 | Choi | ............... | H01B 1/24 |
| 2017/0253717 A1* | 9/2017 | Shin | ............... | C08K 9/02 |

* cited by examiner

ELECTRICALLY CONDUCTIVE, POLYMERIC VEHICLE COMPONENT

FIELD OF THE DISCLOSURE

The present disclosure generally relates to a vehicle component. More specifically, the present disclosure relates to a polymeric vehicle component that is electrically conductive.

BACKGROUND OF THE INVENTION

The design flexibility afforded by many polymeric compositions and their relatively light weights and corrosion resistances have made them attractive materials for the replacement of metal components in many applications. However, challenges exist in developing a polymeric composition that possesses a desirable combination of stiffness, strength, toughness, and/or other physical properties for a given application. The present disclosure seeks to address at least some of these challenges.

SUMMARY OF THE INVENTION

According to a first aspect of the present invention, a vehicle component includes a polymeric material, a first filler, and a second filler. The polymeric material can be present at a concentration of at least about 35% by weight of the vehicle component. The first filler can be a carbon-containing filler dispersed within the polymeric material. The carbon-containing filler can be present at a concentration of at least about 20% by weight of the vehicle component. The second filler includes a substrate and carbon nanotubes. The carbon nanotubes extend from a surface of the substrate.

Embodiments of the first aspect of the invention can include any one or a combination of the following features:
  the second filler is present at a concentration of between about 1% and about 15% by weight of the vehicle component;
  the substrate of the second filler contains silica;
  the first filler includes a carbon-containing component chosen from at least one of graphite, graphene, and carbon fiber;
  the first filler includes graphene at a concentration of between about 0.1% by weight of the vehicle component and about 1.0% by weight of the vehicle component;
  the first filler includes carbon fiber at a concentration of between about 20% by weight of the vehicle component and about 40% by weight of the vehicle component;
  the first filler includes graphite at a concentration of between 10% by weight of the vehicle component and 30% by weight of the vehicle component;
  the graphite is a high aspect ratio graphite;
  an electrical conductivity of the vehicle component is about 10 Siemens per centimeter (S/cm) or less;
  the electrical conductivity of the vehicle component is about 5 Siemens per centimeter (S/cm) or less;
  the electrical conductivity of the vehicle component is about 1 Siemens per centimeter (S/cm) or less;
  the carbon nanotubes are single-walled carbon nanotubes;
  the first filler and the second filler interconnect with one another to provide conductive pathways within the polymeric material;
  the vehicle component is a cross-car beam;
  the vehicle component is a surface layer molded upon a base layer; and
  the polymeric material is a polyamide material.

According to a second aspect of the present disclosure, a vehicle component includes a polymeric material, a first filler, and a second filler. The polymeric material can be present at a concentration of at least about 35% by weight of the vehicle component. The first filler can be a carbon-containing filler dispersed within the polymeric material. The carbon-containing filler can be present at a concentration of at least about 20% by weight of the vehicle component. The first filler includes a carbon-containing component chosen from at least one of graphite, graphene, and carbon fiber. The second filler includes a substrate and carbon nanotubes. The carbon nanotubes extend from a surface of the substrate. The second filler is present at a concentration of between about 1% and about 15% by weight of the vehicle component.

Embodiments of the second aspect of the present disclosure can include any one or a combination of the following features:
  an electrical conductivity of the vehicle component is about 1 Siemens per centimeter (S/cm) or less;
  the first filler includes carbon fiber at a concentration of 40% by weight of the vehicle component; and
  the second filler is present at a concentration of about 2% by weight of the vehicle component.

These and other aspects, Objects, and features of the present disclosure will be understood and appreciated by those skilled in the art upon studying the following specification, claims, and appended drawings.

BRIEF DESCRIPTION DRAWINGS

DETAILED DESCRIPTION OF THE PREFERRED EMBODIMENTS

Figure 1:
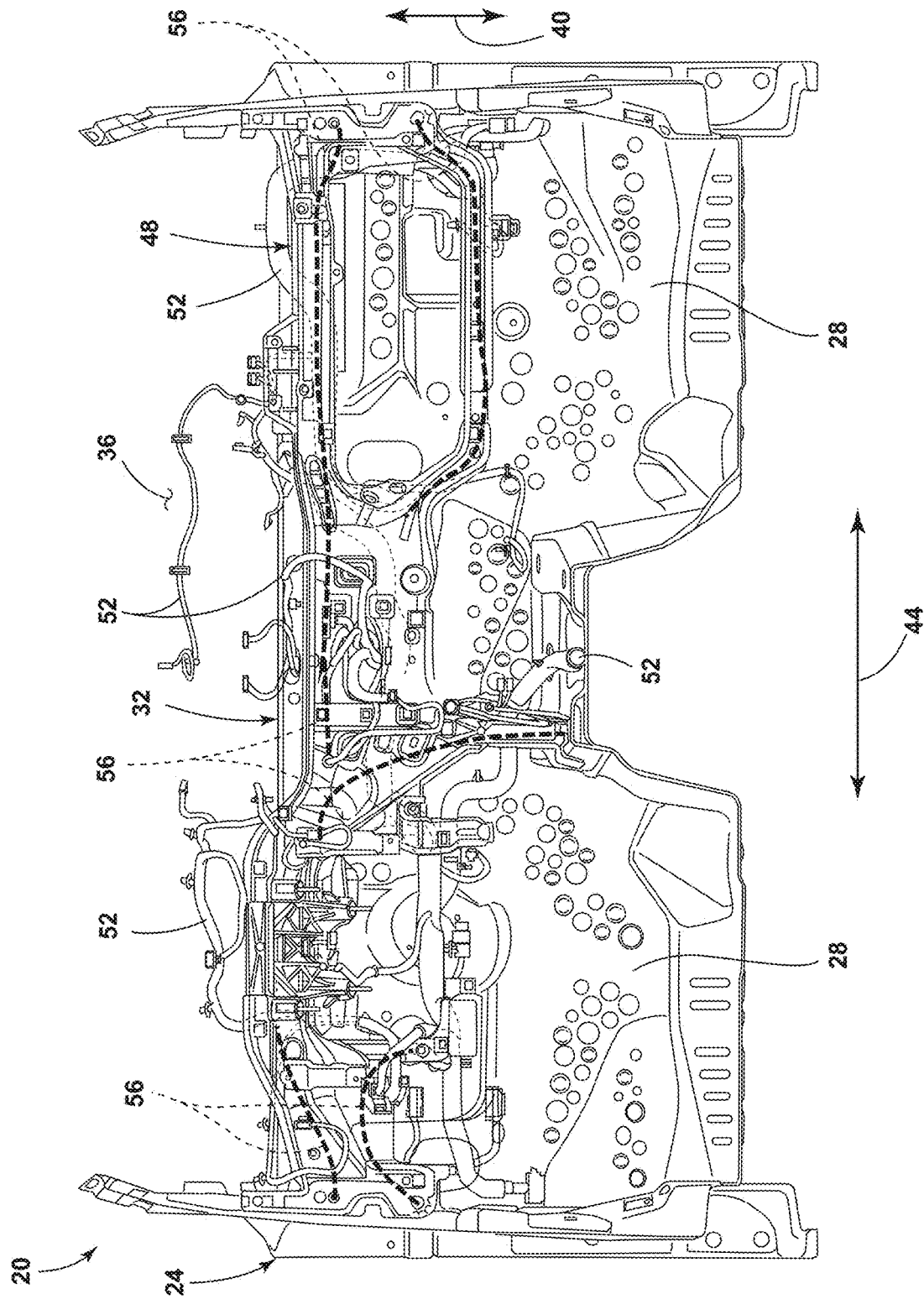
FIG. 1 is a top perspective view of a body of a vehicle, illustrating an interaction between a vehicle component, a wiring harness, and the body; according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle component. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
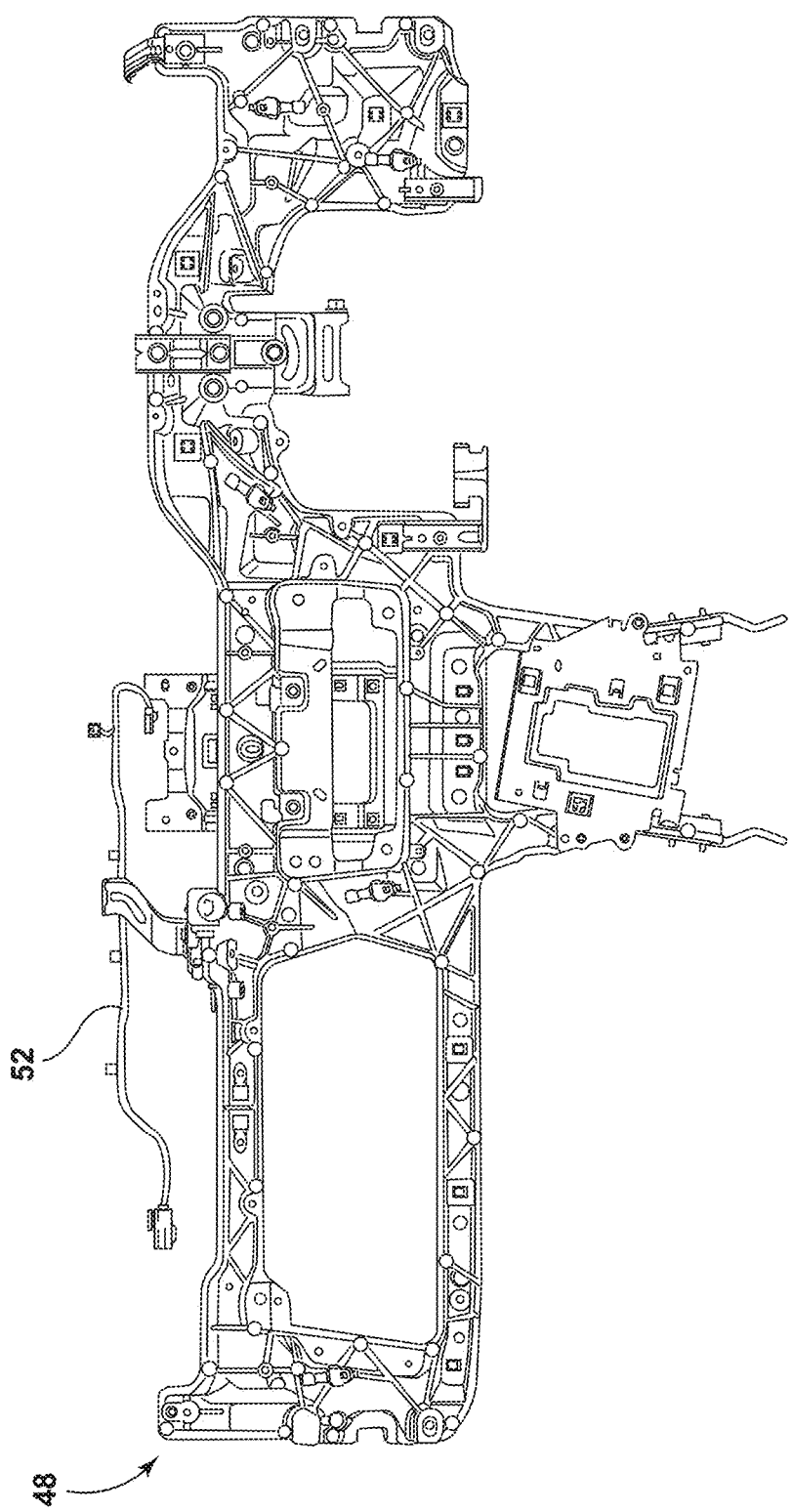
FIG. 2 is a top view of the vehicle component and a portion of the wiring harness, according to one example.
Figure 3:
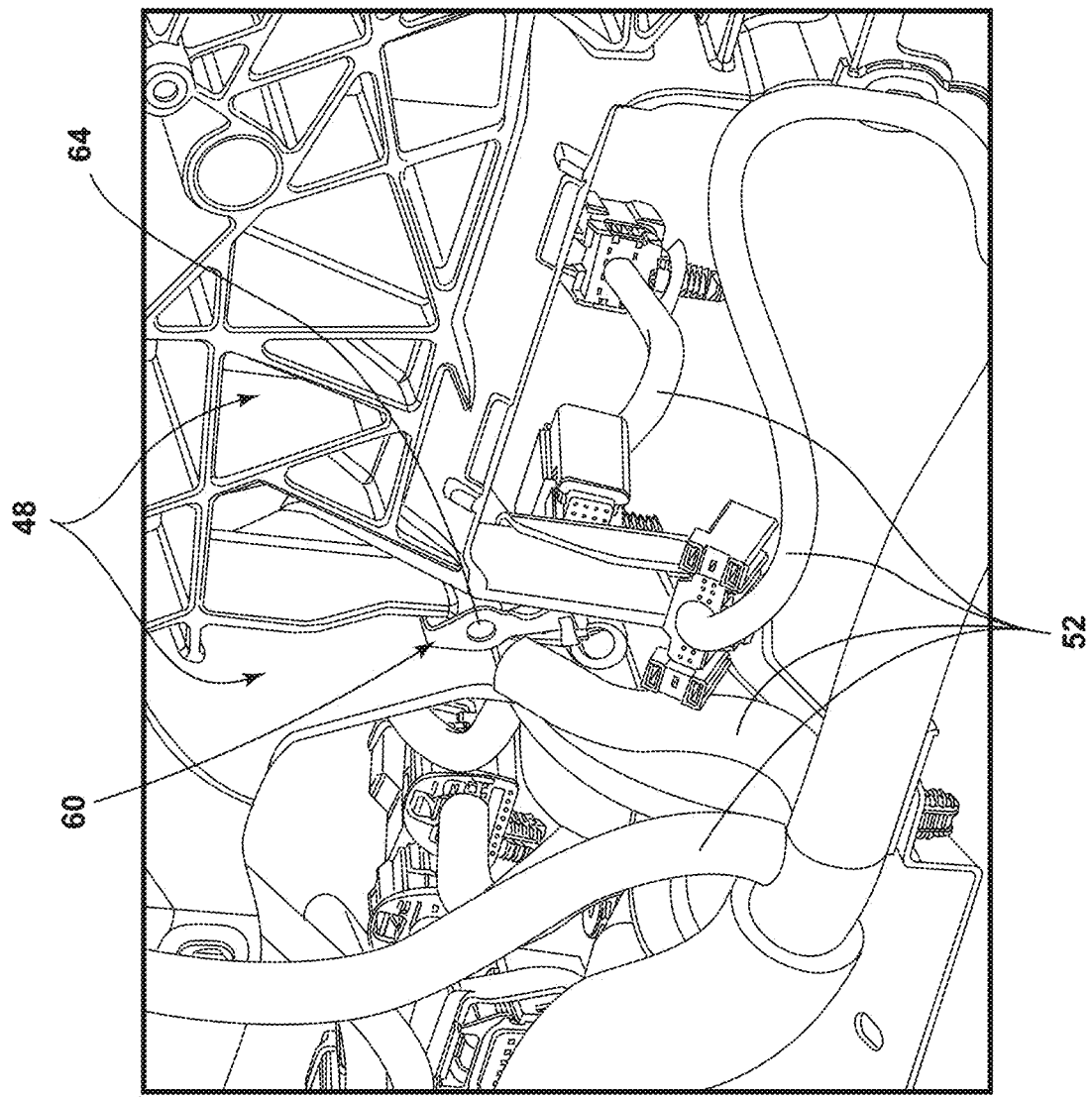
FIG. 3 is a side perspective view of the vehicle component and a portion of the wiring harness, illustrating a portion of the wiring harness removed to show an eyelet coupled to the vehicle component, according to one example.

Referring to FIGS. 1-3, a vehicle 20 is provided with a body 24. In various examples, the vehicle 20 may be a motor vehicle. For example, the vehicle 20 may be a land vehicle, a watercraft, or an aerial vehicle. Specific examples of the vehicle 20 may include, but are not limited to, automobiles, boats, and/or airplanes. While the vehicle 20 may be a motor vehicle, the vehicle 20 is not limited to internal combustion engine motorized vehicles. Rather, the vehicle 20 may be powered by electricity or alternative fuel sources. The body 24 of the vehicle 20 is provided with one or more floor pans 28 and a firewall 32. The firewall 32 may define a portion of a cavity 36. The cavity 36 that is partially defined by the firewall 32 may be utilized as an engine compartment or a storage area. The body 24 of the vehicle 20 extends in a fore-aft or longitudinal direction, as indicated by arrow 40, as well as a side-to-side or lateral direction, as indicated by arrow 44. A vehicle component 48 is coupled to the body 24 of the vehicle 20. The vehicle component 48 may be positioned proximate to the firewall 32 and extend in the lateral direction indicated by arrow 44, In various examples, the vehicle component 48 may be a cross-car beam. The cross-car beam example of the vehicle component 48 may be positioned as at least a portion of an instrument panel of the vehicle 20. Accordingly, in such examples, the vehicle component 48 may receive a plurality of modules, as will be discussed in further detail below. A wiring harness 52 may be coupled to and/or supported by the vehicle component 48. The wiring harness 52 may carry power and/or data signals between various elements of the vehicle 20 (e.g., battery, onboard computers, user-interface modules, etc.). In many examples, the body 24 of the vehicle 20 is made from a material that is electrically conductive. Accordingly, the body 24 of the vehicle 20 may be utilized as a source for grounding electrical components. Various modules or elements of the vehicle 20 may be mounted in regions that are remote from the body 24. In such a situation, typically these remotely located modules or elements of the vehicle 20 can be coupled to grounding wires that extend from the remote region of the vehicle 20 to the vehicle body 24. However, such an arrangement can result in added complexity and bulk of the wiring harness 52, which can increase manufacturing costs in the form of both materials and difficulty of installation. Additionally, the increased use of materials in the vehicle 20 can increase the overall weight of the vehicle 20, thereby decreasing a fuel efficiency of the vehicle 20.

Referring again to FIGS. 1-3, the vehicle component 48 of the present disclosure is made from a polymeric material that has been modified to improve electrical conductivity of the polymeric material and ultimately the vehicle component 48. In various examples, the polymeric material may be a polyamide material. In examples where the vehicle component 48 is a cross-car beam, the cross-car beam is often made of a metallic material to provide both grounding capabilities and structural rigidity. Accordingly, the polymeric material utilized in the vehicle component 48 of the present disclosure may decrease an overall weight of the vehicle 20 when compared to similarly equipped vehicles that are provided with a fully metallic cross-car beam or vehicle component 48, thereby improving a fuel efficiency of the vehicle 20. Additionally, by improving the electrical conductivity of the polymeric material utilized in the vehicle component 48, a length of grounding wires utilized in the wiring harness 52 may be decreased. Similarly, by decreasing a length of grounding wires utilized in the wiring harness 52, a complexity of the wiring harness 52 may be decreased. Therefore, the vehicle component 48 of the present disclosure may simultaneously decrease an overall weight of the vehicle 20, decrease material costs of the wiring harness 52, decrease a complexity of the wiring harness 52, and/or decrease manufacturing costs associated with assembly of the vehicle 20. The improved electrical conductivity of the polymeric material utilized in the manufacture of the vehicle component 48 may permit electrical current to pass through the vehicle component 48 to the body 24, as indicated by grounding paths 56. In various examples, the vehicle component 48 may be provided with one or more eyelets 60 that aid in grounding the various elements or modules coupled to the wiring harness 52. The eyelet 60 may define an aperture 64 therein that receives a fastener 68 (see FIGS. 4 and 5).

Figure 5:
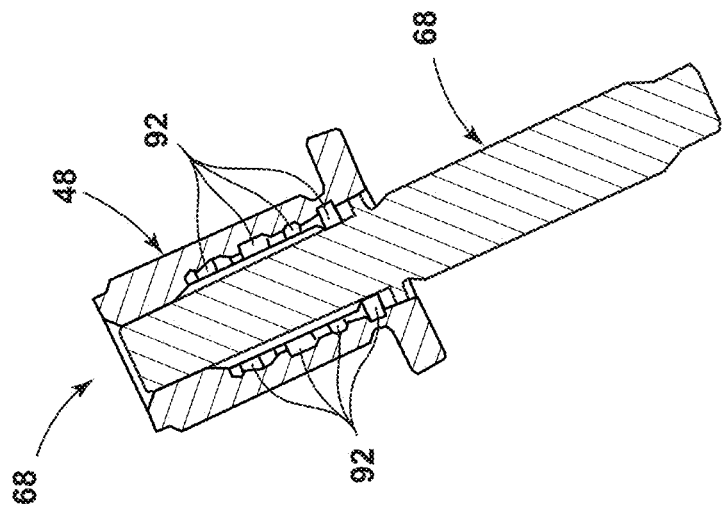
FIG. 5 is a sectional view through the fastener in the absence of the insert, according to one example.
Figure 4:
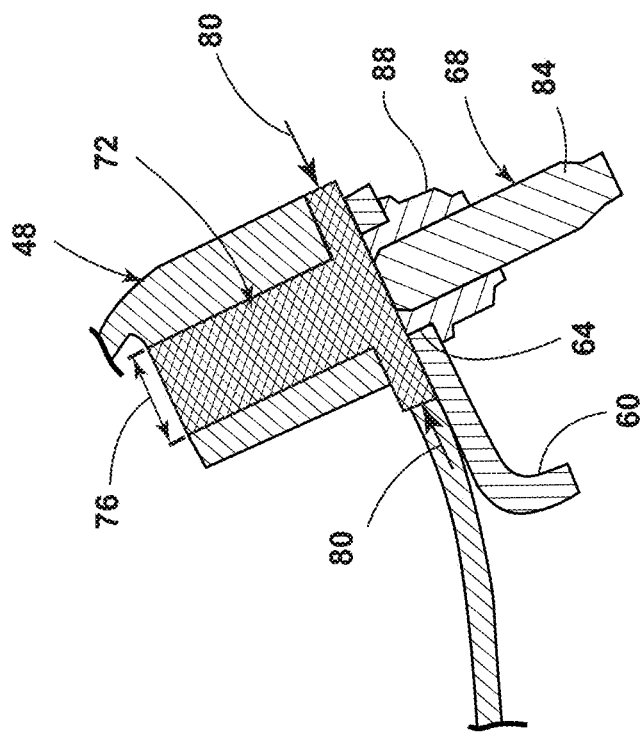
FIG. 4 is a sectional view through a fastener and eyelet coupled to the vehicle component, illustrating an insert, according to one example.
Figure 7:
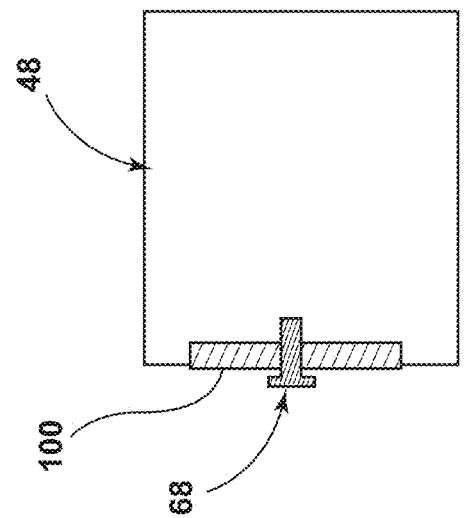
FIG. 7 is a schematic representation of an engagement between the fastener, a plate, and the vehicle component, according to one example.
Figure 6:
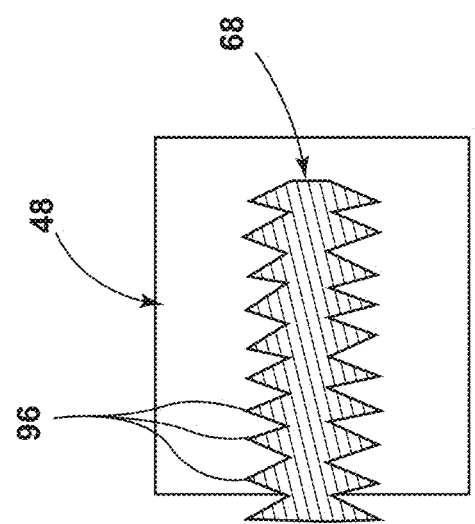
FIG. 6 is a schematic representation of an engagement between the fastener and the vehicle component, according to one example.
Figure 8:
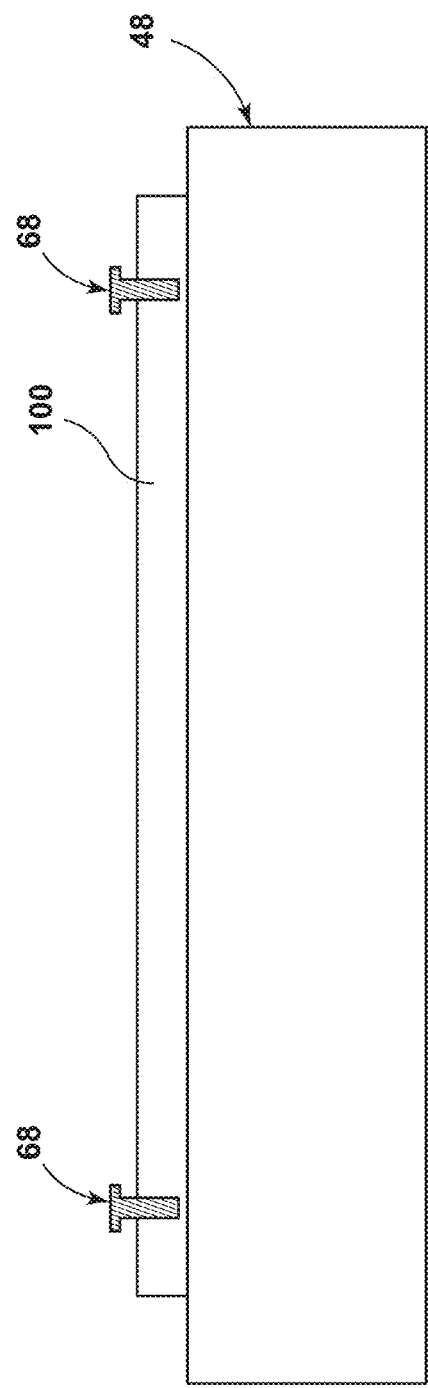
FIG. 8 is a schematic representation of an engagement between the fastener, the plate, and the vehicle component, according to another example.
Figure 9:
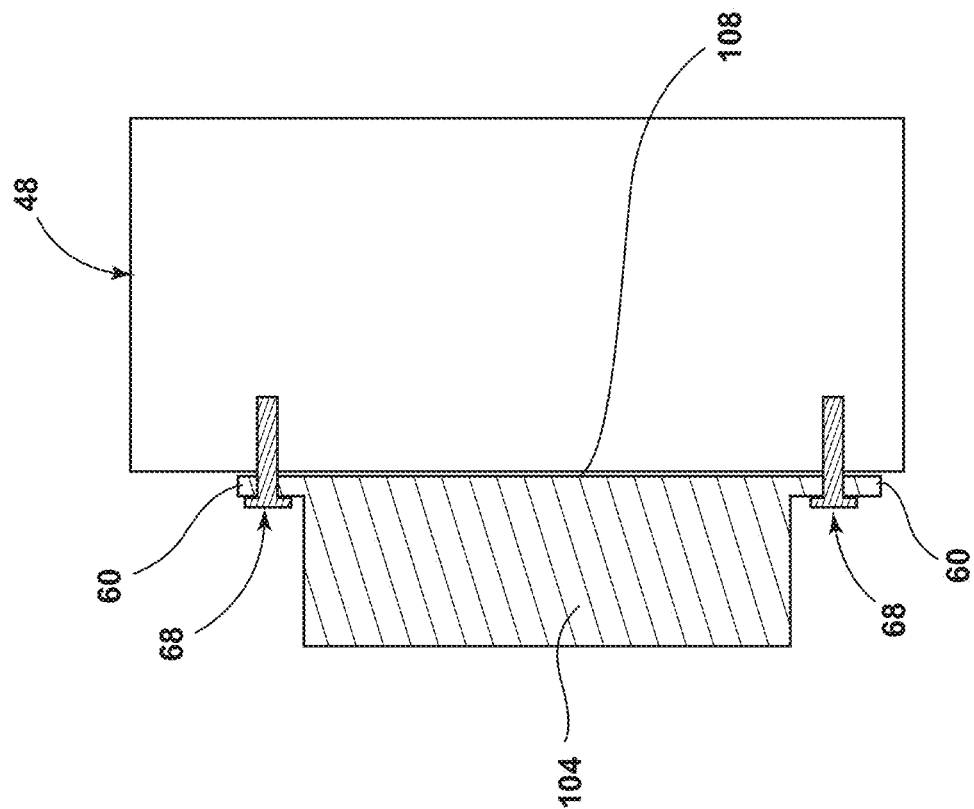
FIG. 9 is a schematic representation of an engagement between a module, fasteners, and the vehicle component according to one example.

Referring now to FIGS. 4 and 5, the fastener 68 is received in the aperture 64 of the eyelet 60. In some examples, the vehicle component 48 may be provided with an insert 72 that is made of a highly-conductive material. For example, the insert 72 may be a metallic bushing or other type of metallic insert. The insert 72 may be molded into the vehicle component 48 during the manufacturing process of the vehicle component 48. The insert 72 may be provided at various locations within the vehicle component 48 where the wiring harness 52 or various modules are intended to be coupled to the vehicle component 48. The insert 72 may be arranged in a T-shaped manner. Accordingly, the insert 72 may be provided with a first width 76 and a second width 80. The second width 80 may be greater than the first width 76. The second width 80 may be positioned near a surface of the vehicle component 48 that is proximate to a location for one of the eyelets 60. Accordingly, the second width 80 of the insert 72 may engage with a surface of the eyelet 60 such that a conductive path is established between the eyelet 60 and the insert 72. Such an arrangement may further improve the electrical conductivity between the fastener 68 and the vehicle component 48. Additionally, a surface area of contact between the fastener 68 and the vehicle component 48 may be effectively increased as the insert 72 and the eyelet 60 provide additional surface area contact between the eyelet 60, the insert 72, and the vehicle component 48. In various examples, the fastener 68 may be a threaded fastener, such as a screw or a bolt, however the present disclosure is not so limited. In various examples, the insert 72 may be provided with a stud 84 that protrudes from a surface of the vehicle component 48. In such an example, the eyelet 60 may be received by the stud 84 and a secondary fastener 88 may be coupled to the stud 84 in a manner that retains the eyelet 60 to the vehicle component 48 and ensures physical contact between the eyelet 60 and the insert 72. In some examples, the eyelet 60 may be a portion of a module (e.g., a casing or housing) that is coupled to the vehicle component 48 such that a grounding may be made available to the module by way of the interaction between the eyelet 60 and the vehicle component 48. For example, a casing of the module may be provided with the eyelet 60, with the eyelet 60 being coupled to the vehicle component 48 in a manner that establishes an electrically conductive pathway (e.g., one of the grounding paths 56) between the vehicle component 48 and the module. By way of comparison, FIG. 5 depicts an example of the fastener 68 that does not employ the insert 72 made of a highly-conductive material. Region 92 depicts a corresponding decrease in a surface area of contact between the vehicle component 48 and the fastener 68.

Referring to FIGS. 6-9, a variety of engagements between the vehicle component 48 and the fastener 68 are depicted. In some examples, the fastener 68 may be sized based on an expected or calculated electrical load that will be passing through a given one of the fasteners 68. For example, the fastener 68 may be an M6 sized screw or bolt with at least 10 mm of engagement between the vehicle component 48 and the fastener 68 along a length of the fastener 68. A depth of engagement between the fastener 68 and the vehicle component 48 may be varied based on a maximum expected or calculated load to be carried by the given fastener 68. In various examples the fastener 68 may have a depth of engagement that is greater than 10 mm and less than 20 mm when utilizing an M6 sized bolt or screw. For example, a depth of engagement between the fastener 68 and the vehicle component 48 may be about 10 mm, about 11 mm, about 12 mm, about 13 mm, about 14 mm, about 15 mm, about 16 mm, about 17 mm, about 18 mm, about 19 mm, or about 20 mm. It is contemplated that an M8 sized bolt or screw may be utilized and the depth of engagement between the vehicle component 48 and the fastener 68 may correspondingly be adjusted. In such an example that utilizes an M8 sized bolt or screw, the depth of engagement between the vehicle component 48 and the fastener 68 may be greater than 20 mm and less than 30 mm. For example, the depth of engagement between the fastener 68 and the vehicle component may be about 20 mm, about 21 mm, about 22 mm, about 23 mm, about 24 mm, about 25 mm, about 26 mm, about 27 mm, about 28 mm, about 29 mm, or about 30 mm. It is contemplated that larger bolt or screw sizes may be employed (e.g. M12). However, utilizing such a large bolt or screw in the polymeric material of the vehicle component 48 may be less desirable. Alternatively, it may be more desirable to split the expected load at the given fastener 68 to be carried by multiple of the fasteners 68, thereby decreasing the size of the fastener 68 and the corresponding load expected to be carried by each individual fastener 68. Regardless of the size and depth of engagement between the vehicle component 48 and the fastener 68, the fastener 68 may be provided with threads 96 that are cut deeply into the fastener 68 (see FIG. 6). By providing the fastener 68 with threads 96 that are deeply cut into the fastener 68, a surface area of contact between the fastener 68 and the vehicle component 48 may be increased, thereby improving an electrical connection between the vehicle component 48 and the fastener 68.

Referring again to FIGS. 6-9, in some examples, the vehicle component 48 may be provided with a plate 100 molded therein during the manufacturing process. Alternatively, the plate 100 may be coupled to the vehicle component as a separate assembly step to the manufacturing process of the vehicle component 48. In either instance, the plate 100 may be made of an electrically conductive material (e.g. a metallic material) that may be utilized to improve electrical grounding between the vehicle 20 and the wiring harness 52 or module that is coupled to the vehicle component 48. In such an example, it may be possible to provide the vehicle component 48 with a lower electrical conductivity than in examples where the plate 100 is not employed. In some examples, such as that depicted in FIG. 8, the plate 100 may be coupled to an exterior surface of the vehicle component 48 without being recessed within the vehicle component 48 when compared to adjacent surfaces of the vehicle component 48. In various examples, the fastener 68 may engage with the plate 100 and the vehicle component 48 to accomplish the grounding capabilities disclosed herein (see FIG. 7). In such an example, the grounding paths 56 may utilize the fastener 68 and the plate 100 due to direct contact between the vehicle component 48, the fastener 68, and the plate 100. Alternatively, the fastener 68 may be utilized to mount a module or to ground the wiring harness 52 to the plate with the fasteners 68 extending partially through a thickness of the plate 100 such that the fastener 68 does not directly engage with the vehicle component 48. In such an example, the surface area of contact between the vehicle component 48 and the plate 100 may be utilized in the grounding paths 56 to the body 24 of the vehicle 20. In various examples, a module 104 may be coupled to the vehicle component 48 by one or more eyelets 60 defined by the module 104. The eyelets 60 defined by the module 104 may each receive one of the fasteners 68 in a manner that couples the module 104 to the vehicle component 48 by way of the engagement of the fastener 68. In some examples, a junction 108 between the module 104 and the vehicle component 48 may be provided with a thermally conductive mat or the like to transfer thermal energy generated at the module 104 to the vehicle component 48 for thermal dissipation. In one specific example, the module 104 may be a portion of an onboard computing system of the vehicle 20. Accordingly, as the onboard computing system housed within the module 104 generates heat, the thermal energy generated at the module 104 may be dissipated to the vehicle component 48 such that the vehicle component 48 acts as both a heatsink and a grounding element within the vehicle 20.

Figure 11:
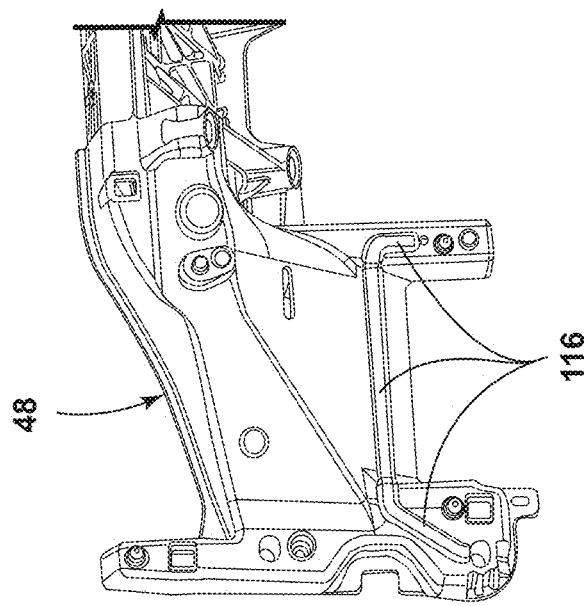
FIG. 11 is a front perspective view of a body-attachment portion extending between the grounding location and a region that engages with the body of the vehicle, according to one example.
Figure 10:
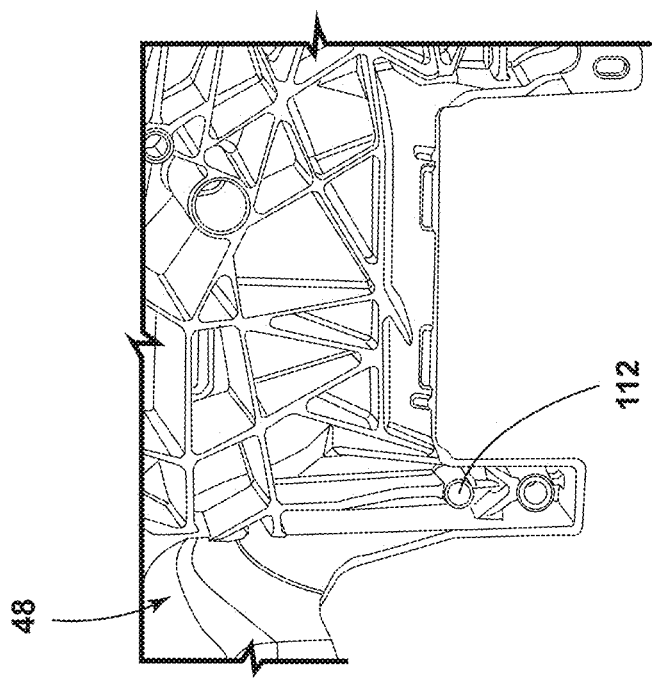
FIG. 10 is a rear perspective view of the vehicle component, illustrating a grounding location, according to one example.

Referring now to FIGS. 10 and 11, rather than employing the insert 72 and/or the plate 100 with the vehicle component 48, it is contemplated that a two shot mold process may be employed where a main body of the vehicle component 48 is molded in a first material that has a lower electrical conductivity (e.g., nylon embedded with carbon fiber); this main body of the vehicle component 48 may then be inserted into a tool and overshot with a second material that has a higher electrical conductivity than the first material (e.g. conductive carbon fiber nylon). Alternatively, a two-shot tool may be employed, where the first material and the second material may be shot into the same tool in succession to ultimately produce the vehicle component 48. In either instance, the wiring harness 52 may be coupled to a grounding location 112, which may or may not include the eyelet 60. The vehicle component 48 may be equipped with a body-attachment portion 116 that may establish one of the grounding paths 56 from the vehicle component 48 to the body 24 of the vehicle 20. The grounding location 112 and the body-attachment portion 116 may be made of the second material that is more electrically conductive than the first material, while the remainder of the vehicle component 48 is made of the first material that is less electrically conductive than the second material. In such an example, the second material may be overshot onto the main body of the vehicle component 48 such that the grounding location 112 and the body-attachment portion 116 are made of the second material and capable of establishing one of the grounding paths 56 between the wiring harness 52, the vehicle component 48, and the body 24 of the vehicle 20.

Figure 12:
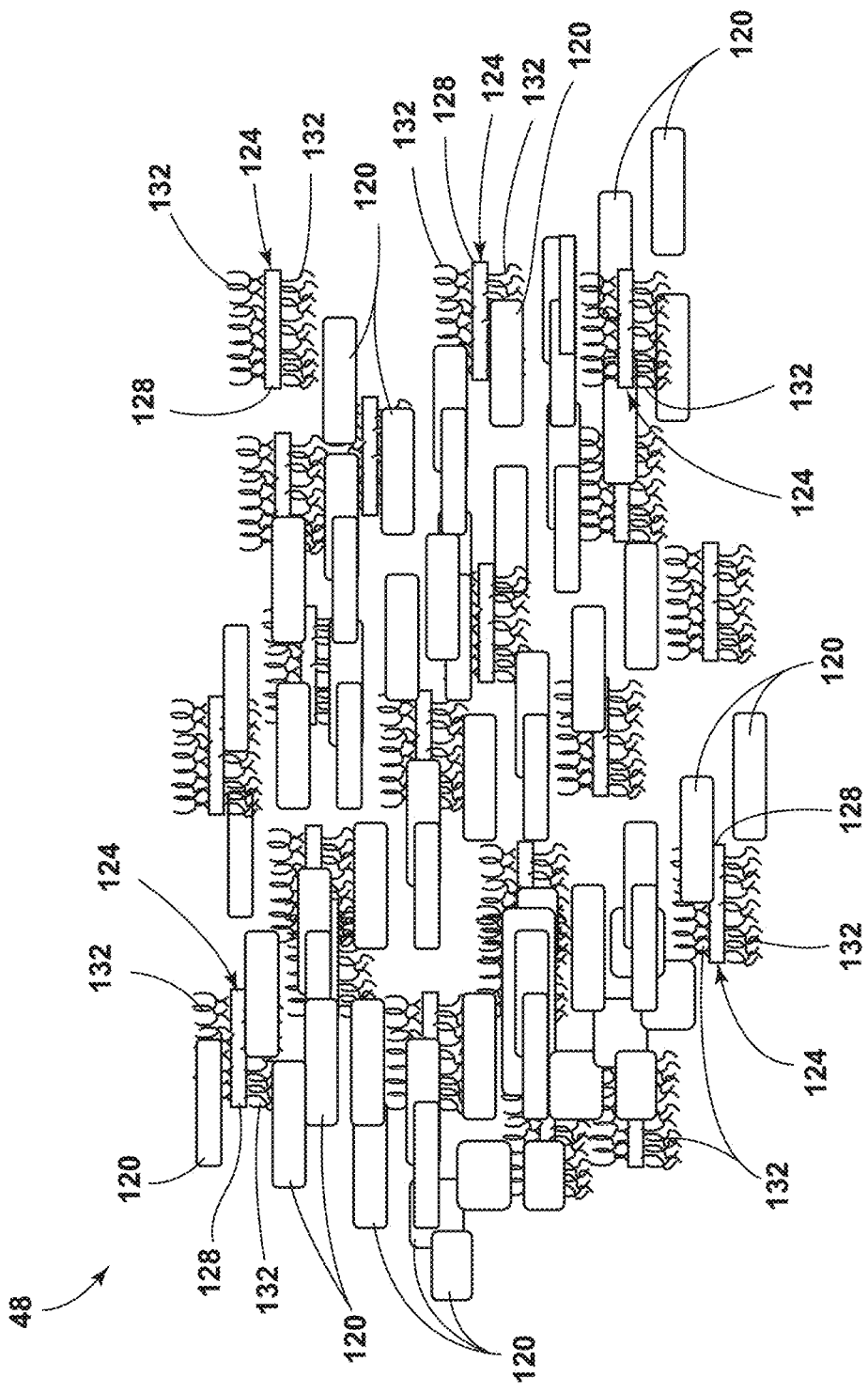
FIG. 12 is a representation of an interaction between a first filler and a second filler within the vehicle component, according to one example.

Referring to FIG. 12, for purposes of illustration and depiction, components of the composition of the vehicle component 48 have been exaggerated to show details of an interaction between the various components. While not being bound by a specific theory, it is contemplated that the improved electrical conductivity provided to the vehicle component 48 may be at least in part due to interactions between the various components of the composition of the vehicle component 48 such that electrical pathways are established through the polymeric material. For example, the vehicle component 48 may include a first filler 120 and/or a second filler 124. In various examples, the first filler 120 may be carbon fibers. In various examples, the second filler 124 may be referred to as carbon nanostructures. The second filler 124 can include a substrate 128 and carbon nanotubes 132, with the carbon nanotubes 132 extending from a surface of the substrate 128. The vehicle component 48 includes a polymeric material as a base or carrier material that receives the first filler 120 and/or the second filler 124. The polymeric material may be present at a concentration of at least about 35% by weight of the vehicle component 48. For example, the polymeric material may be present at a concentration of at least about 35%, at least about 40%, at least about 45%, at least about 50%, at least about 55%, at least about 60%, about 65%, less than about 65%, and/or combinations or ranges thereof. In various examples, the first filler 120 is a carbon-containing filler that is disposed within the polymeric material. The first filler 120 may be present at a concentration of at least about 20% by weight of the vehicle component 48. For example, the first filler 120 may be present at a concentration of at least about 20%, at least about 25%, at least about 30%, at least about 35%, at least about 40%, at least about 45%, at least about 50%, at least about 55%, at least about 60%, about 65%, less than about 65%, and/or combinations or ranges thereof. In some examples, the second filler 124 may be present at a concentration of between about 1% and about 15% by weight of the vehicle component 48. For example, the second filler 124 may be present at a concentration of about 1% by weight of the vehicle component 48, about 2% by weight of the vehicle component 48, about 3% by weight of the vehicle component 48, about 4% by weight of the vehicle component 48, about 5% by weight of the vehicle component 48, about 6% by weight of the vehicle component 48, about 7% by weight of the vehicle component 48, about 8% by weight of the vehicle component 48, about 9% by weight of the vehicle component 48, about 10% by weight of the vehicle component 48, about 11% by weight of the vehicle component 48, about 12% by weight of the vehicle component 48, about 13% by weight of the vehicle component 48, about 14% by weight of the vehicle component 48, or about 15% by weight of the vehicle component 48. In various examples, the second filler 124 may contain silica. For example, the substrate 128 of the second filler 124 may be a glass fiber. Accordingly, in such an example, the carbon nanotubes 132 may extend from the surface of the glass fiber substrate 128. In various examples, the carbon nanotubes 132 may be single-walled carbon nanotubes.

Referring again to FIG. 12, in some examples, the first filler 120 may include a carbon-containing component. The carbon-containing components, when present in the first filler 120, may be graphite, graphene, and/or carbon fiber. When graphene is utilized as at least a portion of the first filler 120, the graphene may be present at a concentration of between about 0.1% by weight of the vehicle component 48 and about 1.0% by weight of the vehicle component 48. For example, the graphene may be present at a concentration of about 0.1% by weight of the vehicle component 48, about 0.2% by weight of the vehicle component 48, about 0.3% by weight of the vehicle component 48, about 0.4% by weight of the vehicle component 48, about 0.5% by weight of the vehicle component 48, about 0.6% by weight of the vehicle component 48, about 0.7% by weight of the vehicle component 48, about 0.8% by weight of the vehicle component 48, about 0.9% by weight of the vehicle component 48, about 1.0% by weight of the vehicle component 48, and/or combinations or ranges thereof. In examples where the first filler 120 includes carbon fiber, the carbon fiber may be present at a concentration of between about 20% by weight of the vehicle component 48 and about 40% by weight of the vehicle component 48. For example, the carbon fiber may be present at a concentration of about 20% by weight of the vehicle component 48, about 25% by weight of the vehicle component 48, about 30% by weight of the vehicle component 48, about 35% by weight of the vehicle component 48, about 40% by weight of the vehicle component 48, and/or combinations or ranges thereof. In examples that utilize graphite as at least a portion of the first filler 120, the graphite may be present at a concentration of between about 10% by weight of the vehicle component 48 and about 30% by weight of the vehicle component 48. For example, the graphite may be present at a concentration of about 10% by weight of the vehicle component 48, about 15% by weight of the vehicle component 48, about 20% by weight of the vehicle component 48, about 25% by weight of the vehicle component 48, about 30% by weight of the vehicle component 48, and/or combinations or ranges thereof. In various examples, the graphite utilized in the first filler 120 may be a high aspect ratio graphite. In various examples, an electrical conductivity of the vehicle component 48 may be less than about 10 Siemens per centimeter (S/CM), less than about 5 Siemens per centimeter (S/CM), less than about 1 Siemens per centimeter (S/CM), and/or combinations or ranges thereof. The fillers utilized in the polymeric material of the vehicle component 48, such as the first filler 120 and/or the second filler 124, may interconnect with one another to provide conductive pathways within the polymeric material. For example, the carbon nanotubes 132 extending from the substrate 128 of the second filler 124 may physically contact nearby portions of the first filler 120 and/or the second filler 124. In this way, the fillers utilized in the polymeric material of the vehicle component 48 may create a conductive bridge, such as the grounding paths 56, which may be utilized by the wiring harness 52, the module 104, and/or other components or elements of the vehicle 20. It is contemplated that the vehicle component 48 may be a surface layer that is molded upon a base layer such that the surface layer is provided with a greater electrical and/or thermal conductivity than the base layer upon which the surface layer is applied.

The present disclosure provides a vehicle component 48 that is polymer-based. Accordingly, a weight of the vehicle component 48 may be less than many alternative compositions, particularly those that utilize metals. Therefore, it is possible to utilize the composition of the vehicle component 48 disclosed herein to decrease an overall weight of the vehicle 20 by decreasing the weight of the vehicle component 48. Additionally, the compositions disclosed herein for the vehicle component 48 may be utilized to tune one or more properties of the vehicle component 48 for a particular application. For example, an electrical conductivity and/or a thermal conductivity may be tuned by adjusting the concentration and/or identity of the first filler 120 and/or the second filler 124. As a result, the vehicle component 48 of the present disclosure may be utilized in endeavors to decrease a weight of the vehicle 20 and improve a fuel efficiency of the vehicle 20 while providing the ability to adjust one or more properties of the vehicle component 48.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle, comprising:
 a body;
 a wiring harness; and
 a vehicle component that is coupled to the body and the wiring harness, wherein the vehicle component is electrically conductive, and wherein the vehicle component provides a grounding path between the wiring harness and the body, the vehicle component comprising:
  a polymeric material, the polymeric material being present at a concentration of at least about 35% by weight of the vehicle component;
  a first filler, wherein the first filler is a carbon-containing filler dispersed within the polymeric material, the carbon-containing filler being present at a concentration of at least about 20% by weight of the vehicle component; and
  a second filler, the second filler comprising a substrate and carbon nanotubes, wherein the carbon nanotubes extend from a surface of the substrate.

2. The vehicle of claim 1, wherein the second filler is present at a concentration of between about 1% and about 15% by weight of the vehicle component.

3. The vehicle of claim 1, wherein the substrate of the second filler contains silica.

4. The vehicle of claim 1, wherein the first filler comprises a carbon-containing component chosen from at least one of graphite, graphene, and carbon fiber.

5. The vehicle of claim 4, wherein the first filler comprises graphene at a concentration of between about 0.1% by weight of the vehicle component and about 1.0% by weight of the vehicle component.

6. The vehicle of claim 4, wherein the first filler comprises carbon fiber at a concentration of between about 20% by weight of the vehicle component and about 40% by weight of the vehicle component.

7. The vehicle of claim 4, wherein the first filler comprises graphite at a concentration of between 10% by weight of the vehicle component and 30% by weight of the vehicle component.

8. The vehicle of claim 7, wherein the graphite is a high aspect ratio graphite.

9. The vehicle of claim 1, wherein an electrical conductivity of the vehicle component is about 10 Siemens per centimeter (S/cm) or less.

10. The vehicle of claim 1, wherein the carbon nanotubes are single-walled carbon nanotubes.

11. The vehicle of claim 1, wherein the carbon nanotubes that extend from the substrate of the second filler physically contact nearby portions of at least one filler chosen from the first filler and the second filler to provide at least a portion of the electrical conductivity of the vehicle component.

12. The vehicle of claim 1, wherein the vehicle component is a cross-car beam.

13. The vehicle of claim 1, wherein the vehicle component is a surface layer molded upon a base layer.

14. The vehicle of claim 1, wherein the polymeric material is a polyamide material.

15. A vehicle component, comprising:
 a polymeric material, the polymeric material being present at a concentration of less than about 40% by weight of the vehicle component;
 a first filler dispersed within the polymeric material, wherein the first filler comprises graphite at a concentration of about 20% by weight of the vehicle component, graphene at a concentration of about 0.5% by weight of the vehicle component, and carbon fiber at a concentration of about 40% by weight of the vehicle component; and
 a second filler, the second filler comprising a substrate and carbon nanotubes, wherein the carbon nanotubes extend from a surface of the substrate, and wherein the second filler is present at a concentration of between about 1% and about 15% by weight of the vehicle component.

16. The vehicle component of claim 15, wherein an electrical conductivity of the vehicle component is about 1 Siemens per centimeter (S/cm) or less.

17. The vehicle component of claim 15, wherein the second filler is present at a concentration of about 2% by weight of the vehicle component.

18. The vehicle component of claim 15, wherein the carbon nanotubes that extend from the substrate of the second filler physically contact nearby portions of at least one filler chosen from the first filler and the second filler to provide at least a portion of an electrical conductivity of the vehicle component.

* * * * *